(12) United States Patent
Goodyear

(10) Patent No.: US 6,418,957 B1
(45) Date of Patent: Jul. 16, 2002

(54) EDUCTOR SYSTEM AND METHOD FOR VAPOR RECOVERY

(76) Inventor: Mark A. Goodyear, 417 Shelly Dr., Lafayette, LA (US) 70503

( * ) Notice: Subject to any disclaimer, the term of this patent is extended or adjusted under 35 U.S.C. 154(b) by 0 days.

(21) Appl. No.: 10/012,065

(22) Filed: Nov. 13, 2001

Related U.S. Application Data

(63) Continuation of application No. 09/551,782, filed on Apr. 18, 2000, now Pat. No. 6,315,000.

(51) Int. Cl.[7] ................................................. F17D 1/18
(52) U.S. Cl. ...................... 137/14; 137/565.33; 137/893
(58) Field of Search ................................. 137/888, 892, 137/893, 14, 565.33

(56) References Cited

U.S. PATENT DOCUMENTS

| | | | | |
|---|---|---|---|---|
| 4,722,363 A | * | 2/1988 | Allyn | ....................... 137/599.1 |
| 5,195,587 A | * | 3/1993 | Webb | ........................... 166/267 |
| 5,325,896 A | * | 7/1994 | Koch et al. | ..................... 141/59 |
| 5,516,119 A | * | 5/1996 | Trackwell et al. | .............. 277/3 |

* cited by examiner

*Primary Examiner*—A. Michael Chambers

(57) ABSTRACT

The EVRU is essentially an eductor, configured and designed, to capture and recover hydrocarbon fluids (gases and/or liquids) and/or other vapors and recombine and reinject into the system so that all the fluids are combined into a closed system to reduce or eliminate emissions (Greenhouse gases, VOC's, HAP's, CO, NOX and any other air pollutants). A measured, known volume of higher pressure fluid is fed into the eductor which draws measured, known volumes of lower pressure, hydrocarbon fluids and/or other vapors from emission (Greenhouse gas, VOC, HAP, CO, NOX and any other air pollutant) sources, combining the higher pressured fluids with the lower pressured fluids to an intermediate pressured combination fluid that is injected back into existing process equipment to close the system and prevent or minimize harmful emissions (greenhouse gases, VOC's, HAP's, CO and any other air pollutants).

2 Claims, 4 Drawing Sheets

EDUCTOR SYSTEM AND METHOD FOR VAPOR RECOVERY

This application is a continuation of application Ser. No. 09/551,782 filed Apr. 18, 2000, now U.S. Pat. No. 6,315,000 issued Nov. 13, 2001.

BACKGROUND OF THE INVENTION

1. Field of the Invention

This invention relates generally to a system and method for the recovery and reintroduction of atmospheric vented gases and more particularly to the recovery and reintroduction of gases and fluids generally discharged into the environment from hydrocarbon separation systems used in production, process and transmission systems.

2. General Background

Eductors or jet pumps have been in use for many years in different applications as a means of pumping, vacuuming, and mixing in a great many applications. Eductors are simple to build and operate with essentially no mechanical parts to break down. The Eductor operates on the principle of a venturi, through which an energized fluid is directed causing a differential pressure across an orifice situated in a mixing chamber. The mixing chamber has a port to allow fluids or gases at a static or lower pressure than the energizing fluid pressure to be drawn into the chamber due to the created differential between the energized or pressurized line and the static or lower pressure inlet lines. The fluids or gases being drawn into the chamber mix with the energized fluid or gases resulting in a mixture of both fluids and or gases as result of the pressure differential between the energized fluid or gases and the fluid or gas being drawn into the mixing chamber from the static or lower pressure inlet line. The pressure and volume of the mixed fluids may be adjusted by controlling the energized and static inlet fluid volume and pressure with a restricting device installed in the inlet lines to the Eductor. The mixed fluid departs the chamber at a reduced pressure less than the inlet energized fluid, but greater than the static or lower pressure fluid or gas being drawn into the mixing chamber. Although various systems using such Eductors have been developed for vapor recovery in handling volatile liquids which emit toxic gas, such as those disclosed by U.S. Pat. Nos. 3,817,265, 5,135,360, 5,139,390, 5,195,587, 5,207,249, 5,325,896, 5,651,389 and 5,957,665. Even closed loop systems such as that disclosed by U.S. Pat. No. 5,516,119 have proven effective in controlling gas emission. However, Eductors are primarily used as mixing and stripping systems such as is disclosed by U.S. Pat. Nos. 3,648,434 and 5,209,762. Other systems utilize various methods for capturing vapors emitted from gas dehydrators, oil storage tank, and catalytic cracking processes while still others utilize a venturi type apparatus for capturing vapors emitted from gasoline being transferred into tanks.

A system utilizing the eductor, or jet pump, although not new to the art, has not been utilized in the manner taught herein for use in gas/oil production, processing or transmission systems for collectively recovering hydrocarbon fluids and gases, including greenhouse gases such as methane, ethane, and hydrocarbon compounds, VOC's, Volatile Organic Compounds that react and produce ozone in the lower atmosphere, HAP, Hazardous Air Pollutants including benzene, toluene, ethybenzene, xylene, n-hexane, 2-2-4 trimethyl pentane, and CO and NOX, gas produced from combustion and/or released from natural gas, as well as many other air pollutants currently being vented into the atmosphere from the various stages of a hydrocarbon separation processing systems for reinjection and recirculation within the processing system without the use of any external energy or powered mechanical pumps etc.

Some current systems use compressors to produce condensation for dilution, while others use flares or mix the exhaust gases and fluids with other fuel gases to produce fuel to be burned in engines or heater burners utilized with the hydrocarbon processing system itself. These existing processes create combustion emissions (CO & NOX) themselves which must also be exhausted. In some cases these systems use outside energy sources such as electricity or natural gas to operate and are therefore more costly than the process disclosed herein utilizing the EVRU.

Therefore, there is a need for an efficient, economical system capable of capturing hydrocarbon emissions from the various vented exhaust ports within separation systems used for production, processing and transmission of oil and gas and reintroducing the vented contaminates in a closed loop system back into the system without interrupting or using any additional energy.

SUMMARY OF THE INVENTION

The disclosed EVRU or Eductor Vapor Recovery Unit disclosed herein serves to collect, contain and recycle emissions generally exhausted or otherwise emitted into the atmosphere from hydrocarbon separation systems used in processing hydrocarbons chemicals etc., including the production and transmission process of such hydrocarbons and chemicals through sales lines etc. in a manner resulting in a closed loop system. The vapor recover process herein taught is directed primarily to the recovery of vapors emitted from hydrocarbon separation and reactor processes and the reintroduction of such vapors with no external energy source and not to eductor type units used for vapor recovery used in external fuel tank vapor recovery for fuel distribution or fuel blending systems and the like. The EVRU is considered far superior to other methods and processes presently in service within the hydrocarbon separation processing systems as discussed above.

The EVRU essentially includes an eductor or jet pump operating on the venturi principle as its core element. The system further includes flow safety valves, flow measuring elements, a flow control mechanism, pressure sensing devices, and temperature sensing and indicating devices. Pressure and temperature isolating valves are also installed in the energized fluid line entering the eductor for replacing or repairing of these devices.

In operation, the eductor inlet or energized fluid or gas inlet receives the energized fluid which passes through the venturi orifice, thereby creating the desired differential pressure determined by the controlled energized fluid pressure and volume regulated by the inlet flow control mechanism. The energized EVRU fluid or gas volume is proportional to the volume of the fluids or gases being drawn from the lower pressure emission vents of the static hydrocarbon process system to which the EVRU is attached, as a result of the pressure differential created by the, EVRU jet pump venturi. The static or low pressure emissions (greenhouse gases, VOC's, HAP's, CO and any other air pollutants) line entering the eductor further includes a directional flow valve to prevent back pressure from over-pressurizing the vessel. Also included are a flow measuring element to measure the volume of fluids being recovered from the vessel, a pressure sensing device to determine the emission (greenhouse gases, VOC's HAP's, $CO^2$ and any other air pollutants) fluid pressure entering the eductor, as well a temperature sensing and. indicating device to assist with the control of the emissions fluid entering the eductor. Pressure and temperature isolating valves are also installed in the emission fluid line entering the eductor for replacing or repairing of these devices. The eductor emissions fluid inlet receives vapor emissions and/or liquids and mixes these fluids with the energized fluid in the mixing chamber. The mixed fluids converge and flow through the eductor outlet and through the outlet line. The outlet line consists of a pressure sensing device to determine the mixed fluid pressure departing the eductor and a temperature sensing and indicating device to assist with the control of the mixed fluid departing the eductor. Pressure and temperature isolating valves are installed in the mixed fluid line departing the eductor for replacing or repairing of these devices. The mixed fluid outlet also contains a flow safety device to prevent back flow and over-pressurizing of all components upstream of the flow safety device. The final destination of the mixed fluids (energized fluid and emissions (greenhouse gases, VOC's, HAP's, CO and any other air pollutants)) is a compatible hydrocarbon processing vessel having an operating pressure less than the energized fluid, greater than the emissions fluid, and slightly less than or equal to the mixed fluid pressure which closes the system by recycling the emissions back into the processing system and ultimately out through the gas or oil sales pipe lines and/or the water disposal lines.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
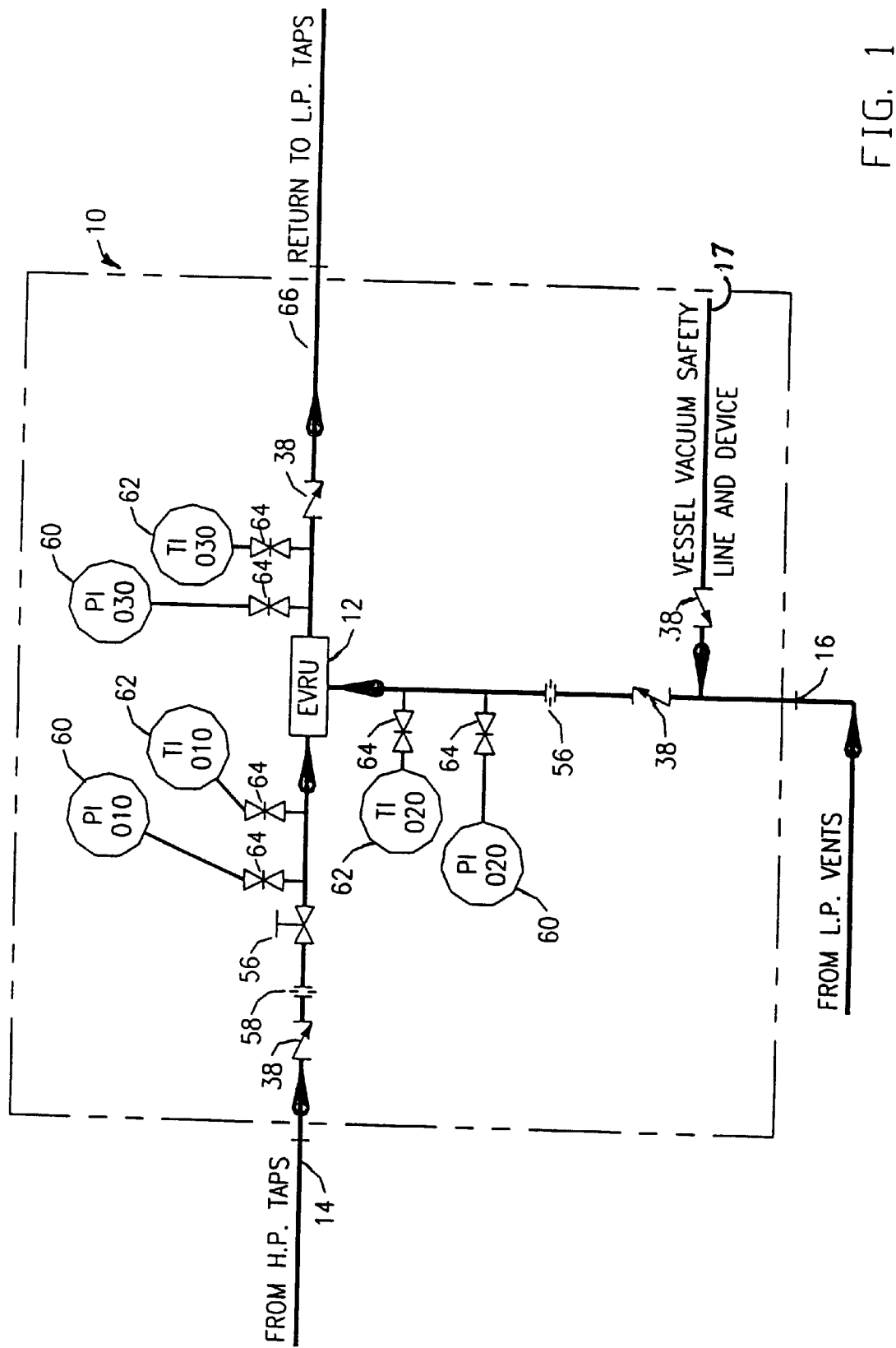
FIG. 1 is a schematic flow diagram of the EVRU system.

As seen in FIG. 1 the EVRU or Eductor Vapor Recovery Unit 10 essentially includes an eductor or jet pump 12 as its core element. The eductor or pump 12 operates on the venturi principle, whereby an energized fluid is directed though the eductor 12 causing a differential pressure across an orifice situated in a mixing chamber. The mixing chamber has a port to allow fluids at a static or lower pressure to be drawn into the chamber due to the created differential between the energized or pressurized line 14 and the static or lower pressure inlet line 16. The static or low pressure fluids being drawn into the eductor 12 mixing chamber mix with the energized fluid resulting in a mixture of both fluids as a result of the pressure differential between the energized fluid and the fluid being drawn into the mixing chamber from the static or lower pressure inlet line 16. Energized or pressurized fluid with pressures above mixer discharge pressure may be derived from taping a number of sources generally present in typical hydrocarbon separation systems 13 used in the production, process or transmission phase such as the schematic diagram seen in FIG. 2. Energizing fluid connection points, as illustrated by dash lines, are available by tapping into the well-head's-full flow stream line 18, the free-water knockout -line 19 or gas line 20, the liquid line heater-gas stream line 22, the H.P. separator gas 24,and oil outlet lines 25, the I.P. separator oil, gas and water outlet lines 29.30,31, the gas sales pipeline contact tower 32, and/or any compressor stage discharge or outlet lines 33,34 35. The pressure sources may be selectively attached to a manifold or header 36 which is also attached to the EVRU inlet line 14.

As seen in FIG. 1, the inlet line 14 to the EVRU eductor system 10 includes a flow valve 38, which allows flow only to the inlet of the jet pump eductor 12, a flow measuring element 56 for measuring the energized fluid entering the eductor 12, a flow control valve 58 to control the pressure and volume of the energized fluid entering the eductor, a pressure sensing device 60 to determine the controlled pressure entering the eductor, a temperature sensing and indicating device 62 to assist with the control of fluids or gases entering the eductor.

Pressure and temperature isolating valves 64 are installed in the supply line 14 entering the eductor for replacing or repairing of these sensing devices. In operation, the eductor inlet or energized fluid inlet receives the energized fluid which passes through the venturi orifice, which creates the desired differential pressure determined by the controlled energized fluid pressure and volume regulated by the flow control mechanism. The energized volume is proportionally higher than the volume and pressure of the emitted (greenhouse gases, VOC's, HAP's, NOX and any other air pollutants) fluids from the hydrocarbon process system 13 being drawn into the mixing chamber by the pressure differential created by the venturi, through the static or low pressure line 16.

Figure 1B:
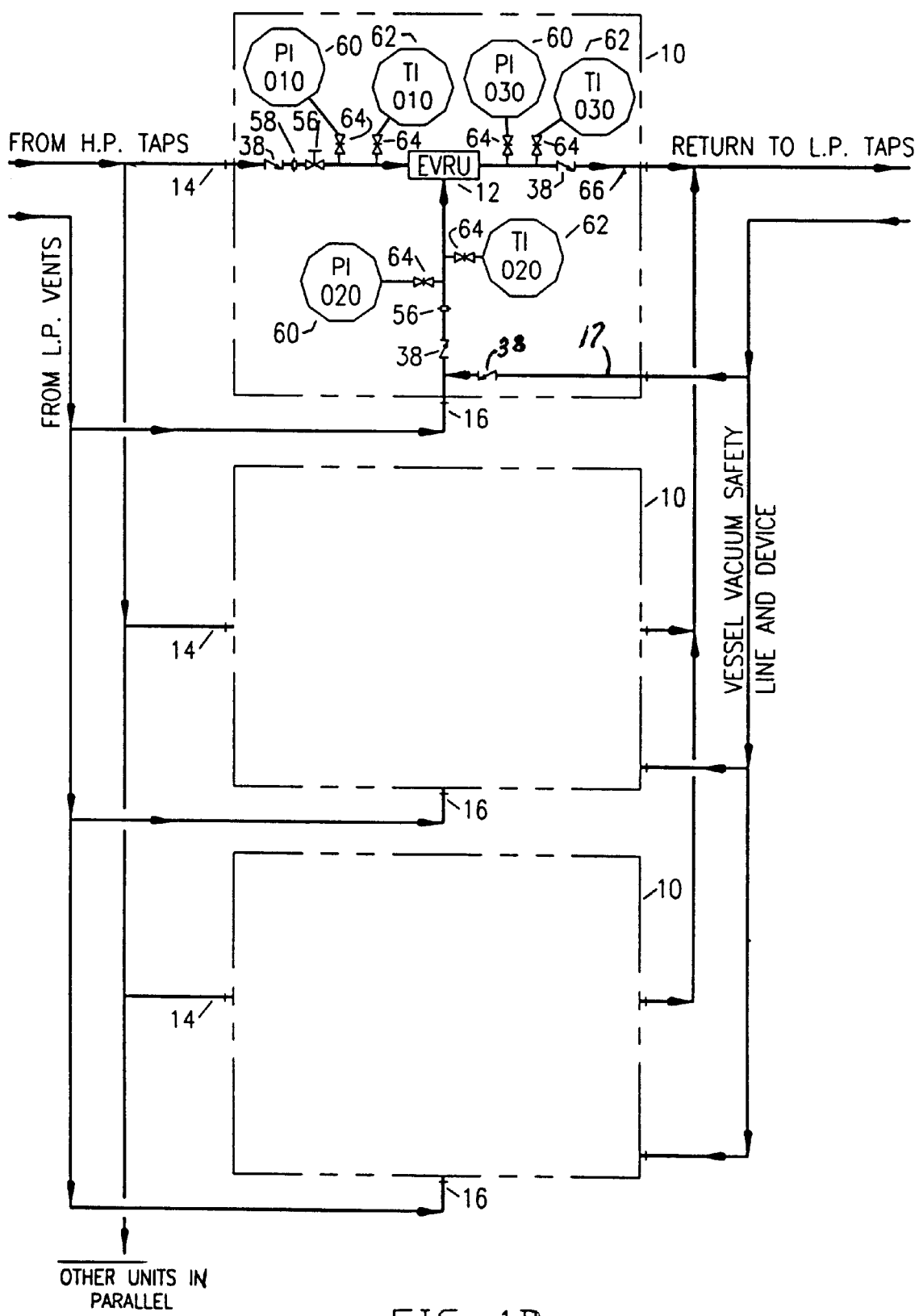
FIG. 1B is a schematic flow diagram of EVRU systems connected in Parallel.
Figure 1C:
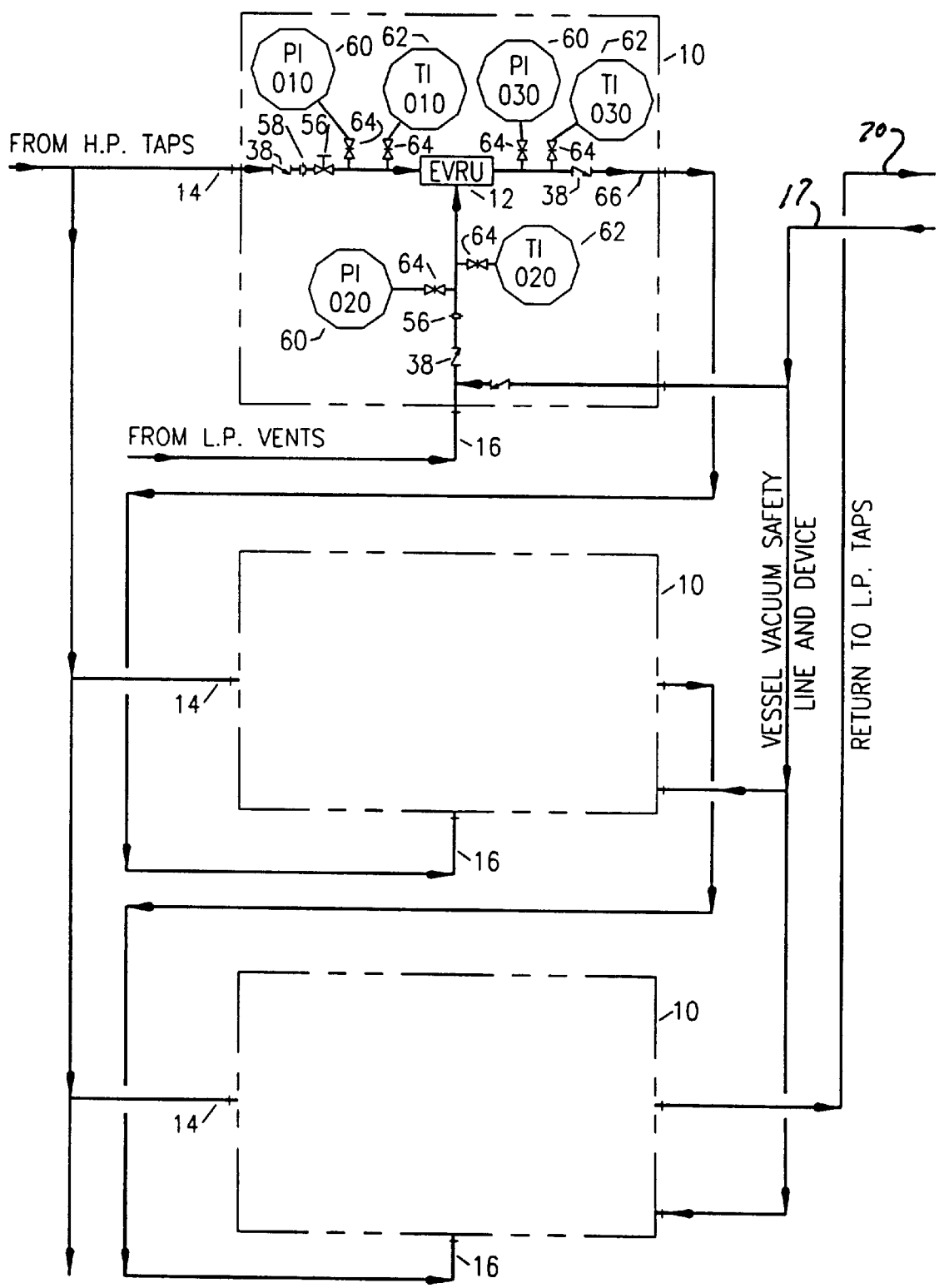
FIG. 1C is a schematic flow diagram of EVRU systems connected in Series.

It should be noted that ratio between pressure and volume of the mixed fluids may be adjusted to some degree by controlling the energized and static inlet fluid volume and pressure with the flow control valve 58 installed in the inlet lines to the eductor 12. However, additional eductor jet pumps 12 may be installed in the EVRU system 10 and selectively connected as necessary to the various line taps though out the processing system 13 or simply connected in parallel as seen in FIG. 1B, with each pump having a different flow characteristic. The system may also be connected in series as seen in FIG. 1C in which case the outlet line 66 is connected to the emissions inlet line 16 of a seceding EVRU system prior to discharge back into the header 70. In some cases each additional jet pump may have its own directional control valve 38, flow measuring element 56, flow control valve 58, and temperature and pressure meters as necessary to monitor the flow though each additional pump 12. Diverter valves and secondary headers may also be added to the headers 36,54, to direct flow to individual jet pumps 12.

The emissions (greenhouse gases, VOC's, HAP's, CO and any other air pollutants) entering the eductor system 10 via manifold or header 54 and low pressure line 16 also includes a directional flow valve 38 to prevent back pressure from over-pressurizing the vessel, a flow measuring element 56 to measure the volume of fluids being recovered from the vessel, a pressure sensing device 60, a temperature sensing and indicating device 62. Pressure and temperature isolating valves 64 are also installed in the emission fluid line entering the eductor for replacing or repairing of these devices. Emissions inlet flow line 16 is also connected to a Vessel Vacuum safety line 17 also containing a relief valve 38 and a recirculating system 100 (not shown) for sensing the vacuum on any given vapor emitting vessel and protecting the emitting fluid or gas vessels in the system from collapsing under excessive vacuum. The low pressure or static fluids may be selectively connected to a central manifold or header 54, illustrated by dash lines seen in FIG. 2, acquired from lines and vents though out the processing system 13 from such sources as the Low Pressure separator gas outlet line 40, the water skimmer vent 42, the heater treater vent 44, the oil storage tank vent 46, the produced water tank vent 48, the Glycol/gas separator vent 50 , and/or Glycol reboiler still column 52.

The eductor emissions fluid inlet line 16 and its connected manifold 54 receives the emissions fluids and gases and mixes these fluids and gases with the energized fluid and/or gases flowing through the eductor in line 14 in the mixing chamber. The mixed fluids converge and flow out through the eductor outlet line 66. The outlet line 66 also includes a pressure sensing device 60 to determine the mixed fluid pressure departing the eductor, a temperature sensing and indicating device 62 to assist operators with the control of the mixed fluid departing the eductor. Pressure and temperature isolating valves 64 are provided here as well and installed in the mixed fluid line departing the eductor 12 for replacing or repairing of the sensing devices.

The mixed fluid outlet line 66 contains a flow safety device 38 to prevent back flow and over-pressurizing of all components upstream of the flow safety device. The mixed fluid departs the mixing chamber of the eductor 12 at a pressure less than the inlet energized fluid but greater than the static or lower pressure fluid or gas being drawn into the mixing chamber through static or low pressure line 16. The mixed fluids (energized fluid and emissions (greenhouse gases) VOC's, HAP's, CO and any other air pollutants which may be present in the system exiting the EVRU system 10 are returned to the processing system 13.by way of line 66 and manifold or header 70, illustrated in FIG. 2 with dash lines, having distribution points though out the system, as further illustrated with dash lines.

Figure 2:
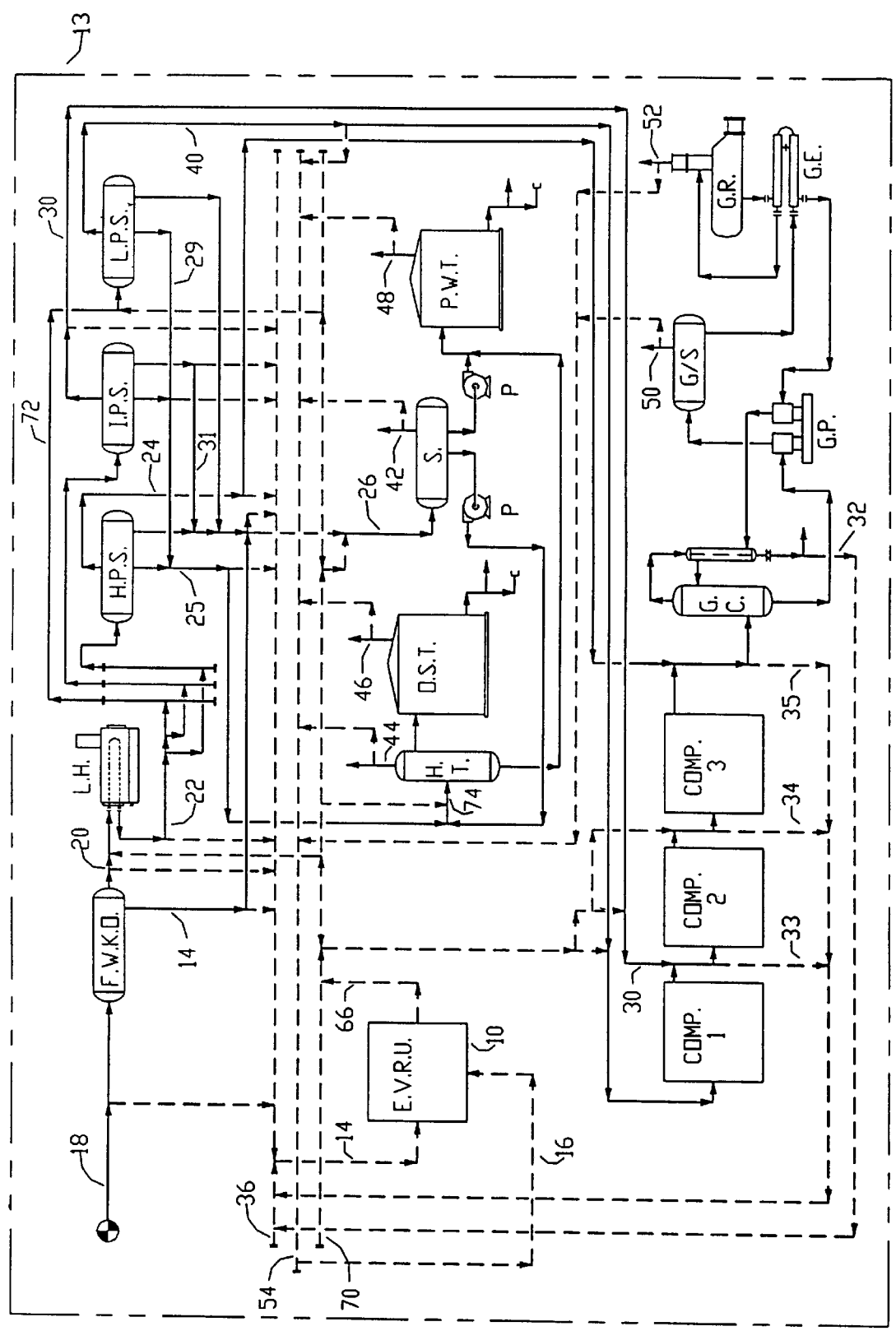
FIG. 2 is a schematic flow diagram of a typical oil/gas production, process and transmission system with EVRU headers leading to EVRU system

As seen in FIG. 2, the mixed fluids may be selectively discharged into the inlet of the L.P. separator line 72, the inlet to the water skimmer tank 26, the inlet to the heater treater tank 74, and/or to the inlet of the first stage compressor scrubber line 40 or successive stages inlet lines 33,34. By reintroducing the diluted emission pollutants mixed with the energized fluids into the processing system 13, the vapors are recovered, reinjected and/or recirculated or otherwise processed and distributed down stream or out through the sales lines or further diluted and disposed of in the water disposal system.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A method of recovering discharged vapors from a hydrocarbon processing system, and injecting and recirculating said vapors within said system utilizing system flow and pressure, comprising the steps of:
   a) providing an eductor unit comprising:
      i) at least one eductor having a first inlet line, a second inlet line, an outlet line, and venturi means within said eductor for vacuuming fluids from said second inlet line and mixing fluids flowing through said first and second inlet lines prior to discharge through said outlet line;
      ii) a directional flow valve connected fluidly within said second inlet line;
      iii) means for measuring fluid flow volume through said first inlet line and said second inlet line;
      iv) a flow control valve connected fluidly within said first inlet line;
      v) a means for connecting at least one energized fluid port within said processing system to said first inlet line;
      vi) a means for connecting at least one vessel emission port within said processing systems to said second inlet line; and
      vii) a means for connecting at least one low pressure port within said processing system to said outlet line, wherein said energized fluid port supplies fluid at a pressure higher than a fluid pressure in said low pressure port, and said low pressure port supplies fluid at a pressure higher than a fluid pressure in said emission port;
   b) connecting at least one energized fluid port within said hydrocarbon processing system to said means for connecting to said first inlet line;
   c) connecting at least one vessel emission port within said hydrocarbon processing system to said means for connecting to said second inlet line;
   d) connecting said outlet line to at least one low pressure port within said hydrocarbon processing system; and
   e) adjusting said flow control valve in a manner whereby pressure in said first inlet line is greater than pressure in said second inlet line and whereby pressure on said outlet line exceeds the pressure in said low pressure port, thereby causing the resulting fluid stream to reenter said hydrocarbon processing system.

2. A vapor recovery and recirculation unit for a hydrocarbon processing system, comprising:
   a) at least one eductor having a first inlet line, a second inlet line, an outlet line, and venturi means within said eductor for vacuuming fluids from said second inlet line and mixing fluids flowing through said first and second inlet lines prior to discharge through said outlet line;
   b) a directional flow valve connected fluidly within said second inlet line;
   c) means for measuring fluid flow volume through said first inlet line and said second inlet line;
   d) a flow control valve connected fluidly within said first inlet line;
   e) a means for connecting at least one energized fluid port within said processing system to said first inlet line;
   f) a means for connecting at least one vessel emission port within said processing systems to said second inlet line; and
   g) a means for connecting at least one low pressure port within said processing system to said outlet lines; wherein said energized fluid port supplies fluid at a pressure higher than a fluid pressure in said low pressure port, and said low pressure port supplies fluid at a pressure higher than a fluid pressure in said emission port.

* * * * *